United States Patent Office 2,830,033
Patented Apr. 8, 1958

2,830,033

COMPOUNDING CHLOROALKYLIDENE BISPHENOLS

David J. Beaver, Richmond Heights, Mo., assignor to Monsanto Chemical Company, St. Louis, Mo., a corporation of Delaware No Drawing. Application July 20, 1955
Serial No. 523,351

13 Claims. (Cl. 260—45.9)

The present invention relates to improvements in rubber compounding and is particularly directed to the problem of preventing discoloration and degradation of natural and synthetic rubbers.

Monochloroalkylidene bisphenols inhibit the aging of rubber. While they are relatively non-staining as compared to the aromatic amines, they nevertheless cause some discoloration of white rubber stocks. The discoloration is especially noticeable with high dosages, i. e. more than 1 part on the rubber. Moreover, these antioxidants are ineffective against exposure cracking.

One of the major problems of the rubber industry is the protection of vulcanizates of sulfur vulcanizable rubbers against exposure cracking, that is degradation of the vulcanizates due to ozone while under static or dynamic stress. The problem is a serious one, particularly with respect to the service life of rubber tires, and is aggravated by the fact in general chemical antioxidants have little or no value in protecting vulcanizates against deterioration by ozone. Waxes which form a protective surface film are useful to inhibit exposure cracking if the rubber is not flexed but protection is lost once the film breaks. When a rubber surface, whether natural or synthetic, comes into contact with an atmosphere containing even a few parts ozone per million a myriad of cracks form on the surface. The cracks continue to grow so that the useful life of the article rapidly terminates. The severity of the problem when rubber articles must be stored for a long time will be readily appreciated.

Many common aliphatic amines inhibit exposure cracking, especially of natural rubber. Of these the cyclohexylamines and particularly dicyclohexylamine are uniquely effective for protecting both natural and butadiene-styrene copolymer rubbers. However, cyclohexylamines are accelerators and accelerator activators with a low critical temperature and weak age resisters. However, it has now been discovered that treating rubber with a monochloroalkylidene bisphenol in conjunction with a cyclohexylamine overcomes the deficiencies of each and achieves advantages unobtainable with either ingredient alone. The combination exerts a synergistic effect against aging, mitigates activation of cure, imparts resistance to exposure cracking, prevents staining of the rubber and provides economical general protection to rubber as well as improving processing of the raw stocks and the physical properties of the vulcanizates.

Salts of dicyclohexylamine have been studied extensively and found to be generally effective. Fatty acid salts are fully equivalent to the free amine if added to provide an equivalent amine content. The preferred salts are the stearate, acetate, oleate, adipate, oxalate, formate, nitrite, toluene sulfonate and dodecylbenzene sulfonate. Less desirable are the benzoate, salicylate and phthalate.

While dicyclohexylamine is preferred, other suitable amines comprise cyclohexylamine stearate, N-methylcyclohexylamine, N-methylcyclohexylamine acetate, N-methylcyclohexylamine stearate, N-2-cyanoethylcyclohexylamine, N-2-chloroallylcyclohexylamine, N-(3-chloro-2-butenyl)-cyclohexylamine, N-nonenylcyclohexylamine, N-dodecenylcyclohexylamine, N-dodecylcyclohexylamine, N-methyldicyclohexylamine, N-methyldicyclohexylamine formate, N-methyldicyclohexylamine stearate, 2-dicyclohexylaminoethanol, dicyclohexylamino-2-propanone, N-butyldicyclohexylamine, N,N-dimethylcyclohexylamine and N,N-dimethylcyclohexylamine stearate.

The chloroalkylidene bisphenol antioxidants may be prepared by the method described in a paper by David J. Beaver and Paul J. Stoffel, "Preparation of substituted bisphenols" in Jour. Amer. Chem. Soc. 74, 3410 (1952). Examples comprise 4,4'-(2-chloroethylidene)bis(6-tert. butyl m-cresol), 4,4'-(2-chloropropylidene)bis(6-tert. butyl m-cresol), 4,4'-(2-chlorobutylidene)bis(6-tert. butyl m-cresol), and 4,4'-(2-chloroheptylidene)bis(6-tert. butyl m-cresol).

Specific embodiments of the invention which illustrate the anti-exposure cracking properties and the scorch resistance of the combinations were prepared from the following base formulation:

|  | Parts by weight |
|---|---|
| Pale crepe rubber | 100.0 |
| Zinc oxide | 25.0 |
| Titanium dioxide | 50.0 |
| Clay | 15.0 |
| Stearic acid | 1.0 |
| Sulfur | 3.0 |
| Benzothiazolyl disulfide | 0.6 |
| Diphenyl guanidine | 0.15 |

Using this base formula stocks were compounded by adding the ingredients as shown in Table I and the resistance of the raw compounds to scorch was evaluated by means of a Mooney plastometer. The scorch point was taken as the point on the plasticity curve when the plasticity has risen 10 points above the minimum value.

*Table I*

| Material Added to Base, Parts by weight | | Mooney Scorch, Mins./ 121° C. |
|---|---|---|
| Dicyclohexylamine Stearate | 4,4'-(2-Chloroethylidene)-bis(6-tert. butyl m-cresol) | |
| none | none | 32.4 |
| 1.5 | none | 20.2 |
| 0.75 | 0.75 | 41.1 |
| 1.0 | 1.0 | 36.7 |
| 1.5 | 1.5 | 25.2 |

The shorter scorch time of the stock containing dicyclohexylamine is clearly evident, yet by combination with the chloroalkylidene bisphenol it is possible to increase the scorch time beyond that of the base alone.

Resistance to exposure cracking was demonstrated by vulcanizing stocks prepared from the above described base in the usual manner and determining the resistance of the vulcanizates to cracking by ozone. For reasons already explained, evaluation under static conditions is not indicative of the service life of rubber articles which must withstand flexing so the vulcanized compositions were evaluated under dynamic conditions in an atmosphere containing a definite concentration of ozone. Samples of the stocks were cured in the form of a belt ½" wide, ¼" thick and 5%6" inside diameter and mounted on 1" diameter shafts. The ozone concentration was maintained at 20–30 parts per hundred million throughout the test and the shafts were rotated at 75 R. P. M. In this manner a momentary elongation through a range of 0–20% was provided at any portion of the test specimen passing over the shaft. (The apparatus and procedure employed are described in Anayltical Chemistry, vol. 25, page 241, February 1953.) The experimental test specimens were compared visually at various intervals noting the extent of cracking. A stock which is severely cracked has no service life remaining in terms of the useful life of a rubber article and where the cracking is designated as extremely severe the degradation is well beyond even this point. The results of tests on the following compositions are recorded in Table II.

| Stock | 1 | 2 | 3 | 4 |
|---|---|---|---|---|
| Material Added to Base, Parts by weight: | | | | |
| 4,4'-(2-Chloroethylidene)-bis(6-tert. butyl m-cresol) | | 1.5 | 0.75 | 1.0 |
| Dicyclohexylamine stearate | | | 0.75 | 1.0 |

Table II

| Stock | Surface Cracking After Flexing in Ozone for— | | | |
|---|---|---|---|---|
| | 24 Hours | 48 Hours | 72 Hours | 96 Hours |
| 1 | none | v. slight | moderate | severe. |
| 2 | do | do | do | Do. |
| 3 | do | none | v. slight | v. slight. |
| 4 | do | do | do | Do. |

Samples of the cured specimens were evaluated for resistance to discoloration by exposing them to ultra violet light radiation from an S–1 sunlamp for ten days. The color of the specimens before and after exposure was evaluated by means of a photovolt reflectance meter calibrated against standard magnesium oxide as 100% reflectance. The percentage of the original reflectivity retained after exposure was calculated and is recorded in Table III. Note that dicyclohexylamine stabilizes the color of rubber as well as reduces discoloration by the phenolic antioxidant.

Table III

| Material Added to Base Parts by weight | | Reflectivity Retained After Exposure, Percent |
|---|---|---|
| Dicyclohexylamine Stearate | 4,4'-(2-Chloroethylidene)-bis(6-tert. butyl m-cresol) | |
| none | none | 82 |
| none | 1.5 | 73 |
| 0.75 | 0.75 | 89 |
| 1.0 | 1.0 | 84 |

Incorporating a cyclohexylamine in addition to the phenolic antioxidant exerts a synergistic effect on the age resistance. Samples of the optimum cures of vulcanizates prepared from the above described base were artificially aged by heating in a circulating air oven for 72 hours at 100° C. The tensile strengths after aging were determined as well as the tensile strengths of the unaged stocks and the percentage of the original tensile retained after aging was calculated. Typical data are tabulated in Table IV.

Table IV

| Material Added to Base Parts by weight | | Percent of Unaged Tensile Retained After Aging |
|---|---|---|
| Dicyclohexylamine Stearate | 4,4'-(2-Chloroethylidene)-bis(6-tert. butyl m-cresol) | |
| 1.5 | none | 46 |
| none | 1.5 | 73 |
| 0.75 | 0.75 | 75 |
| 1.0 | 1.0 | 85 |

It will be appreciated that the cyclohexylamine and chloroalkylidene bisphenol may be mixed together before adding to the rubber or added as separate ingredients. The ratio of the two ingredients to be used in admixture will vary depending upon the particular rubber composition and the results desired. In general the cyclohexylamine should be at least 10% of the total but preferably will not exceed the proportion of the phenolic antioxidant. The amount of the admixtures to be used can also vary. At least 0.5 part of each ingredient per 100 parts of rubber is desirable although other proportions give useful protection.

While the invention has been illustrated by compositions in which elemental sulfur was the vulcanizing agent, other vulcanizing systems are applicable, as for example N,N'-dithiobis morpholine. N,N'-dithioamines is a satisfactory vulcanizing agent. Any sulfur vulcanizing agent is suitable whether in the form of elemental sulfur or selenium or a sulfur compound which releases sulfur at vulcanizing temperature. The sulfur level can be varied to achieve particular advantages. For example even better aging stocks result from reducing the sulfur. About 1.4 parts is optimum for GR–S and about 1.0% is optimum for natural rubber. Similarly, other sulfur vulcanizable rubbers may be used in the practice of the invention. These include homopolymers and copolymers of diene hydrocarbons. A variety of sulfur vulcanizable diene hydrocarbon rubbers are known, several of which have achieved commercial importance and may be used to advantage in practice of the invention.

It is intended to cover all changes and modifications of the examples of the invention herein chosen for purposes of disclosure which do not constitute departures from the spirit and scope of the invention.

What is claimed is:

1. A sulfur vulcanizable diene hydrocarbon rubber composition having incorporated therein a small amount each of a monochloroalkylidene bisphenol and a member selected from the group consisting of cyclohexylamines and salts thereof in an amount at least 10% but not more than 50% of the combined weight with the phenol, the combined weight being sufficient to retard degradation.

2. A sulfur vulcanizable diene hydrocarbon rubber composition having incorporated therein a small amount each of a monochloroalkylidene bis(6-alkyl m-cresol) and an alphatic monoamine containing two cyclohexyl groups the amount of cyclohexylamine compound being at least 10% but not more than 50% of the combined weight with the phenol, the combined weight being sufficient to retard degradation.

3. A sulfur vulcanizable diene hydrocarbon rubber composition having incorporated therein a small amount each of a monochloroalkylidene bis(6-alkyl m-cresol) and dicyclohexylamine the amount of cyclohexylamine compound being at least 10% but not more than 50% of the combined weight with the phenol, the combined weight being sufficient to retard degradation.

4. A sulfur vulcanizable diene hydrocarbon rubber composition having incorporated therein a small amount each of a monochloroalkylidene bis(6-alkyl m-cresol) and a fatty acid salt of dicyclohexylamine the amount of cyclohexylamine compound being at least 10% but not more than 50% of the combined weight with the phenol, the combined weight being sufficient to retard degradation.

5. A sulfur vulcanizable diene hydrocarbon rubber composition having incorporated therein a small amount each of 4,4'-chloroethylidenebis(6-tert. butyl m-cresol) and dicyclohexylamine the amount of cyclohexylamine compound being at least 10% but not more than 50% of the combined weight with the phenol, the combined weight being sufficient to retard degradation.

6. A sulfur vulcanizable diene hydrocarbon rubber composition having incorporated therein a small amount each of 4,4'-chloroethylidenebis(6-tert. butyl m-cresol) and a fatty acid salt of dicyclohexylamine the amount of cyclohexylamine compound being at least 10% by not more than 50% of the combined weight with the phenol, the combined weight being sufficient to retard degradation.

7. A method of vulcanizing a sulfur vulcanizable diene hydrocarbon rubber which comprises heating the rubber, a sulfur vulcanizing agent and a small amount each of a monochloroalkylidenebis(6-alkyl m-cresol) and an aliphatic monoamine containing two cyclohexyl groups the amount of cyclohexylamine compound being at least 10% but not more than 50% of the combined weight with the phenol, the combined weight being sufficient to retard degradation.

8. A method of vulcanizing a sulfur vulcanizable diene hydrocarbon rubber which comprises heating the rubber, a sulfur vulcanizing agent and a small amount each of 4,4'-chloroethylidenebis(6-tert. butyl m-cresol) and dicyclohexylamine the amount of cyclohexylamine compound being at least 10% but not more than 50% of the combined weight with the phenol, the combined weight being sufficient to retard degradation.

9. A method of vulcanizing a sulfur vulcanizable diene hydrocarbon rubber which comprises heating the rubber, a sulfur vulcanizing agent and a small amount each of 4,4'-chloroethylidenebis(6-tert. butyl m-cresol) and a fatty acid salt of dicyclohexylamine the amount of cyclohexyl amine compound being at least 10% but not more than 50% of the combined weight with the phenol, the combined weight being sufficient to retard degradation.

10. Vulcanized diene hydrocarbon rubber having incorporated therein a small amount each of a monochloroalkylidienebis(6-alkyl m-cresol) and an aliphatic monoamine containing two cyclohexyl groups the amount of cyclohexylamine compound being at least 10% but not more than 50% of the combined weight with the phenol, the combined weight being sufficient to retard degradation.

11. Vulcanized diene hydrocarbon rubber having incorporated therein a small amount each of 4,4'-chloroethylidenebis(6-tert. butyl m-cresol) and dicyclohexylamine the amount of cyclohexylamine compound being at least 10% but not more than 50% of the combined weight with the phenol, the combined weight being sufficient to retard degradation.

12. Vulcanized diene hydrocarbon rubber having incorporated therein a small amount each of 4,4'-chloroethylidenebis(6-tert. butyl m-cresol) and a fatty acid salt of dicyclohexylamine the amount of cyclohexylamine compound being at least 10% but not more than 50% of the combined weight with the phenol, the combined weight being sufficient to retard degradation.

13. A composition comprising 10%–90% of 4,4'-chloroethylidenebis(6-tert. butyl m-cresol) and 90%–10% of a fatty acid salt of dicyclohexylamine the amount of cyclohexylamine compound being at least 10% but not more than 50% of the combined weight with the phenol, the combined weight being sufficient to retard degradation.

References Cited in the file of this patent

UNITED STATES PATENTS

| | | |
|---|---|---|
| 2,332,896 | D'Alelio | Oct. 26, 1943 |
| 2,514,363 | Barnes et al. | June 11, 1950 |
| 2,605,249 | Albert | July 29, 1953 |